(12) United States Patent
Lengen

(10) Patent No.: US 7,260,529 B1
(45) Date of Patent: Aug. 21, 2007

(54) COMMAND INSERTION SYSTEM AND METHOD FOR VOICE RECOGNITION APPLICATIONS

(76) Inventor: Nicholas D. Lengen, 13835 Old Glory Rd., Lore City, OH (US) 43755

( * ) Notice: Subject to any disclaimer, the term of this patent is extended or adjusted under 35 U.S.C. 154(b) by 828 days.

(21) Appl. No.: 10/179,874

(22) Filed: Jun. 25, 2002

(51) Int. Cl.
*G10L 15/26* (2006.01)
(52) U.S. Cl. ..................................... 704/235
(58) Field of Classification Search ................ 704/235, 704/270, 275, 251, 231; 345/168, 173
See application file for complete search history.

(56) References Cited

U.S. PATENT DOCUMENTS

| | | | |
|---|---|---|---|
| 5,835,893 A | 11/1998 | Ushioda | |
| 5,893,064 A * | 4/1999 | Kudirka et al. | 704/270.1 |
| 5,915,236 A * | 6/1999 | Gould et al. | 704/251 |
| 5,977,886 A | 11/1999 | Barile | |
| 6,088,671 A * | 7/2000 | Gould et al. | 704/235 |
| 6,100,882 A | 8/2000 | Sharman | |
| 6,125,342 A | 9/2000 | Selesky | |
| 6,138,098 A | 10/2000 | Shieber | |
| 6,213,880 B1 | 4/2001 | Sim | |
| 6,216,183 B1 * | 4/2001 | Rawlins | 710/100 |
| 6,281,883 B1 | 8/2001 | Barker | |
| 6,323,845 B1 * | 11/2001 | Robbins | 345/168 |
| 6,401,065 B1 * | 6/2002 | Kanevsky et al. | 704/256.4 |
| 6,668,244 B1 * | 12/2003 | Rourke et al. | 704/275 |
| 6,694,295 B2 * | 2/2004 | Lindholm et al. | 704/252 |
| 2003/0028382 A1 * | 2/2003 | Chambers et al. | 704/275 |

* cited by examiner

*Primary Examiner*—Angela Armstrong
(74) *Attorney, Agent, or Firm*—LaValle D. Ptak

(57) ABSTRACT

A speech recognition system and method operates a speech recognition application on a computer in a continuous dictation mode. A separate key pad is coupled to the computer through the USB port, and includes a plurality of keys for providing command signals representative of a desired computer operation command which override the dictation mode of the speech recognition application whenever such a command is operated. This allows the user to insert commands, such as punctuation, numerals, "next line", "next paragraph", and the like, directly from the key pad while maintaining operation of the voice recognition application in its continuous dictation mode.

17 Claims, 4 Drawing Sheets

COMMAND INSERTION SYSTEM AND METHOD FOR VOICE RECOGNITION APPLICATIONS

INVENTION DISCLOSURE

This application is based on the material in invention disclosure document No. 499034, filed on Aug. 24, 2001.

BACKGROUND

Computer based speech processing technology currently is employed in two different broad categories. The first of these categories is speech synthesis, which is the ability to respond to a user activated input to generate or synthesize spoken language from text or stored digital speech representation. The second of these categories is that of speech recognition, which allows a computer to accept and process spoken language. It is this latter technology to which this application is directed.

Speech recognition, or speech-to-text, involves the capturing and digitizing of sound waves, converting them to basic language units or phonemes, constructing words from the phonemes, and contextually analyzing the words to ensure correct spelling for words that sound alike (such as "write" and "right"). The determination of spelling from such sound-alike words is based upon the context of the preceding input in most cases.

The speech recognition process takes place through speech recognition application software, also frequently referred to as "speech recognition engines". Such software or speech recognition engines are what is used to convert the acoustical signals resulting from spoken words to digital signals, and then to deliver recognized speech as text to the computer display monitor or printer. To accomplish this, such applications, which are produced by several different software sources utilize a microphone into which the user speaks. For example, a user may speak the words "what time is it?". The microphone captures the sound waves and generates electrical impulses or analog signals corresponding to these sound waves. The sound waves then are supplied to a sound card, which converts the analog signals to digital signals recognizable by a computer, such as a personal computer (PC).

The speech recognition application or speech recognition engine converts the digital signals to phonemes, and then from there, into words. For example, the phonemes for the present example "what time is it?" would be "w aa td t aym ih s ih it". The speech recognition software then processes these phonemes as words to produce "what time is it". It should be noted in this example, that the question mark (?) is not present in the finally produced conversion from speech to text, since the software cannot recognize implied punctuation or, without separate commands, other types of punctuation.

Currently, most speech recognition application software supports continuous speech, meaning that the user can speak naturally into a microphone at the speech of most conversion. Two such systems which operate in this manner are the IBM Via Voice™ produced by IBM Corporation, and DRAGON NATURALLY SPEAKING™ produced by Lermout & Hauspie Speech Products. Prior to such continuous speech recognizers, isolated or discrete speech recognizers required the user to pause after each word, which is a very cumbersome and unnatural way of speaking. Such systems currently are being replaced by continuous speech engines or continuous speech recognition applications of the type mentioned above for the DRAGON NATURALLY SPEAKING™ and VIA VOICE™ systems.

Continuous speech recognition engines currently support two different modes of speech recognition. The first of these modes is the dictation mode, in which the user enters data by speaking directly through the microphone, into the computer, in the continuous manner mentioned above. The other mode is the command and control mode, in which the user initiates computer operations by speaking commands or asking questions. The dictation mode allows the user to dictate memos, letters, e-mail messages and the like, as well as to enter data using a speech recognition dictation engine or speech recognition application. The possibilities for what can be recognized are limited, however, by the size of the recognition application's dictionary of words, or its "grammar".

Most recognizers which support a dictation mode are speaker-dependent, meaning that the accuracy varies on the basis of the user's speaking patterns and accent. To ensure accurate recognition, the application must create or access a "speaker profile" that includes a detailed map of the user's speech patterns used in the matching process during recognition. In order to accomplish this, such speech recognition applications or speech engines employ an initial training mode, in which the user reads a specific text into the computer, which then is stored in the form of the phonemes for that user's speech, to generate that same text. Since the application "knows" the precise words used in the training text, the translation of the speaker's accent and manner of speaking into those words is used to create the basic stored library of sounds for producing the translation of those sounds into the various words of the dictionary of words used in the system. Consequently, the application creates a "speaker profile" which includes a detailed map of the user's speech patterns used in the matching process during recognition of subsequent dictation.

The command and control mode of operation allows the simplest implementation of a speech interface in an existing application. In the command and control mode, the grammar (or list of recognized words) is limited to a relatively short list of available commands. This is of much more finite scope than what is required for the list or dictionary for continuous dictation, which must encompass nearly the entire dictionary in any particular language. As a consequence, the command and control mode allows more accurate performance and reduces the processing overhead (memory, for example) required by the application. The limited grammar or dictionary needed for the command and control mode also enables speaker-independent processing, eliminating the need for speaker profiles or "training" of the speech recognition application or recognizer. The purpose of speech recognition software and systems is to reduce reliance upon the traditional data entry of information to a computer via a keyboard, or to allow the computer to be provided with inputs in environments where a keyboard is impractical, such as in small mobile devices, or in mobile phones, for example.

Obviously, from the foregoing, it is apparent that the more "human" the voice recognition system and method can be made, the more likely users are to utilize such a system for performing various computer tasks, including dictation of text such as letters, documents, such as the present one, as well as educational and entertainment applications via the worldwide web and the like. Even though relatively sophisticated voice recognition application software systems, such as the two mentioned above, presently exist, the problem in naturally flowing speech which occurs is that of recognizing the command and control functions or instructions, and properly executing them in the flow of dictation which is to be translated into words or text. In order to do this, it is necessary to provide a way for the speech recognition application to differentiate and recognize command instructions or words and separate them from dictation.

To allow a person to speak commands in the middle of dictation, another routine is added to the probability checker of such applications to spot words and phrases which have a low probability score for the current sentence or text material being dictated. This phrase is then compared with a list of known command phrases and checked for a match. If one is found, then a command function is carried out. A problem with operating in this manner, however, is that even though it may be rare, the word or phrase may very well be a part of a flowing dictated text; and to carry out a command, instead of transforming the spoken sounds into a printed or text word, creates an error in the final document.

Systems of the type such as the DRAGON NATURALLY SPEAKING™ or the IBM VIA VOICE™ attempt to allow what is called natural language commands, which is an ability to give an instruction in a person's own words rather than instructions selected by the developer of the application. This increases the usability of such systems, since the user may known what he or she wants to do, but not what the application being used calls it. To achieve such control, it is necessary to recognize the significant words within the command, and then combine them to form an instruction. Many words which are spoken do not add to the overall meaning of a command; and once they have been disregarded, it is easier to match the command words with existing concepts within the application which is being controlled.

To use natural language command, however, requires all of the processing needed for dictation, plus additional processing to pick out the command words. Typically, with systems of the type mentioned above, the system is controlled to recognize spoken command phrases as commands by causing the user to deviate from normal continuous spoken dictation. For example, currently available speech recognition engines or applications operate to interpret a pause in the dictation as a signal to start the probability checker for a command instruction following the pause. Expressed in other words, in order to initiate a command, a pause must be made in the normal flow of dictation. The pause is of a distinct length, to cause the application engine to begin to recognize the spoken phrase or word following the pause as a command instruction. Once the command is carried out, another pause is required to switch the system back into the dictation mode. This interrupts the flow of dictation because this is an unnatural way of speaking for most persons.

In order to clearly identify the spoken words following a pause, systems also may include an additional instruction, such as the spoken word "computer" following the pause, to then couple the pause with the spoken instruction word to cause the system to interpret the sounds following as instructions or command functions for the computer. The utilization of this two-part technique significantly reduces the potential for errors in the completed text, at the expense, however, of an unnatural speech rhythm and pattern in the dictated material.

The U.S. Pat. No. 6,125,342 to Selesky is directed to a voice recognition system with command recognition to perform various command functions. This patent includes pronoun semantic analysis for interpreting command statements.

The U.S. Pat. No. 6,100,882 to Sharman is directed to an audio conferencing speech recognition software and system. Speech from users at one work station is displayed as text at other work stations. This is repeated for all of the work stations in the conferencing network; so that all of the text is stored in a text file at all of the work stations. There is no disclosure in this patent, however, for the differentiation between dictation and command inputs.

The U.S. Pat. No. 6,281,883 to Barker is directed to a hand-held data entry device which includes two or more buttons on it. One of the buttons is for recording dictation information; and the other is for switching the system to a voice command. Thus, when the voice command button is operated, words or phrases spoken into the microphone in the device are interpreted by the computer as command mode instructions; so that voice input with this button depressed is interpreted by the computer as voice command instructions.

It is desirable to provide a voice recognition software application and method which overcomes the disadvantages of the prior art discussed above, and which facilitates the operation of the voice recognition application to allow a user to utilize the voice recognition application in a continuous dictation mode, and which clearly allows the computer to recognize command instructions unambiguously, during operation of the voice recognition application in the continuous dictation mode, without requiring unnatural modification of the dictation flow of the user.

SUMMARY OF THE INVENTION

It is an object of this invention to provide an improved voice recognition system and method.

It is another object of this invention to provide an improved voice recognition system and method utilizing an auxiliary input device.

It is an additional object of this invention to provide an improved voice recognition system and method for controlling the processing and evaluation sequencing of inputted data to maximize error free results.

It is yet another object of this invention to provide an improved voice recognition system and method utilizing auxiliary inputs for operation commands to the computer with which the system and method is used.

It is a further object of this invention to provide a voice recognition system and method operating in a continuous dictation mode with an auxiliary input source for command functions.

In accordance with a preferred embodiment of the invention, a voice or speech recognition system is operated in its continuous dictation mode for converting spoken words into text. The system and method has a command capability for causing a computer to perform specific actions in response to command inputs. The command inputs are supplied from a key pad coupled with the computer, and which has at least one key on it for overriding the speech recognition application upon operation of the key to input a specific command to the computer.

DETAILED DESCRIPTION

Figure 1:
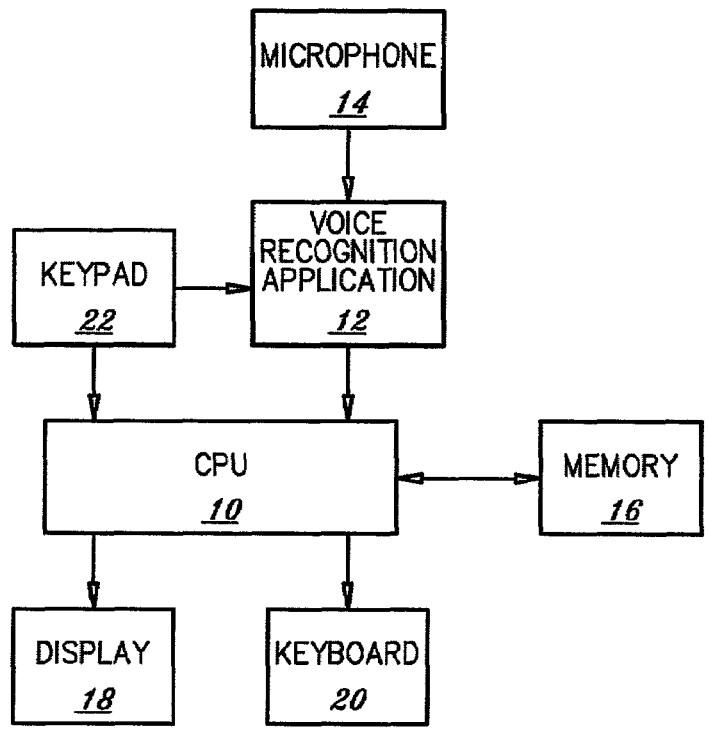
FIG. 1 is a block diagram of a system of a preferred embodiment of the invention.

Reference now should be made to the drawings, in which the same reference numbers are used throughout the different figures to designate the same or similar components. FIG. 1 is a diagrammatic representation of a typical personal computer (PC) system using voice activated or speech activated software. A central processing unit (CPU) 10 is coupled with a memory 16 for supplying information to, and retrieving information from, the memory 16 in response to operation of various programs which are operating on the CPU 10.

Typically, the CPU 10 employs a keyboard 20 for conventional keyboard interface with various programs operating within the computer to provide text for word processing and e-mail applications, and to provide operating instructions to the computer for performing various functions, depending upon the program which is installed and operating in the CPU 10 at the time. A visual display 18 is used to provide a visual indication of the computer operation. Such a display 18 typically is a CRT or other commonly used display. The portion of the system of FIG. 1 which has been described thus far is a standard configuration; and it may be used in conjunction with other peripheral equipment, such as modems, printers, facsimile machines, and the like.

FIG. 1 has been further provided with additional components comprising a preferred embodiment of the invention. These components include a speech or voice recognition application 12, which may be any type of software application for operating with a CPU 10 to convert voice or speech input into text and instructions for operating the CPU 10. As mentioned previously, two such systems which are typical of those which may be used (but which are not inclusive of such systems) are the DRAGON NATURALLY SPEAKING™ speech recognition application and the IBM VIA VOICE™ speech recognition application. Other types of speech recognition application software which are suitable for use with standard personal computer configurations also may be employed.

Typically, such speech application systems and software include a microphone 14 for supplying the voice or speech input to the application software 12 for processing in conjunction with the CPU 10 and its memory 16 to produce text and other operating instructions to the computer. Since such applications are well known, and the manner in which they operate in conjunction with the CPU 10 is also well known, the details of the manner in which the speech application system and software 12 operates in conjunction with the CPU 10 and the memory 16 will not be further be discussed here.

Figure 6:
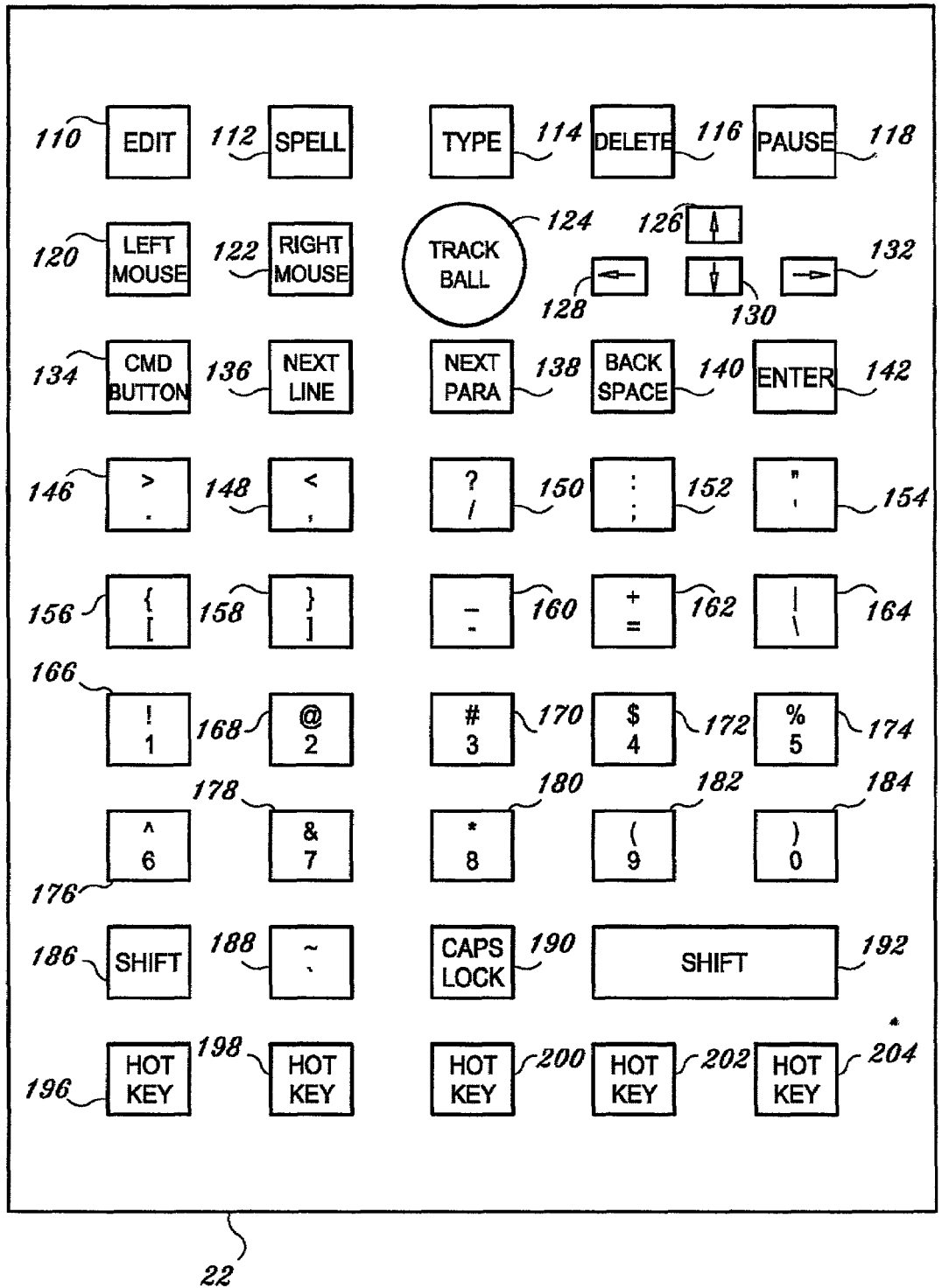
FIG. 6 is a diagrammatic representation of a portion of the embodiment shown in FIG. 1.

In addition to a standard voice or speech application software, such as that shown as application 12, however, the embodiment of the current invention includes a key pad 22, which is distinct from and separate from the keyboard 20. The key pad 22 includes various keys on it to provide commands inputs directly to the CPU 10 through any suitable cable or input port, such as the USB port of currently manufactured PCs comprising the CPU 10. The key pad 22 interfaces both with the CPU 10 and the speech recognition application or voice recognition application software 12 and system 12, in a manner described in greater detail subsequently. FIG. 6 illustrates a typical key pad 22 in greater detail.

It should be noted that the invention, disclosed schematically in FIG. 1 and described subsequently in conjunction with the ensuring flow charts, is designed to work with any standard personal computer (PC) configuration, and it is not dependent upon any particular specific details of the computer system.

Figure 2:
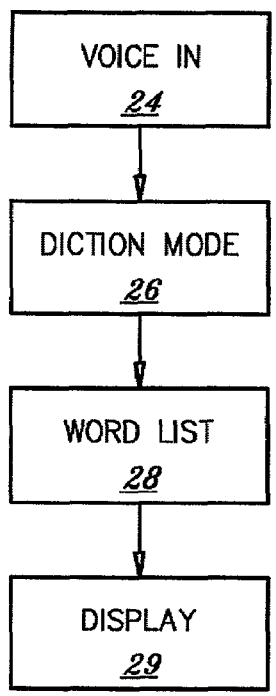
FIG. 2 is a flow chart of one mode of the operation of the system shown in FIG. 1.

FIG. 2 is a simplified flow chart of the operation of the system of FIG. 1 illustrating how the voice recognition application software 12 processes voice or speech into text when the software 12 is operating in the dictation-only mode. As illustrated in FIG. 2, voice input at 24 is applied through the microphone 14 (FIG. 1) to the voice recognition application software 12 of FIG. 1. This software is defaulted or operating so that its evaluation/processing function is restricted only to the dictation mode at 26, as shown in FIG. 2. This restriction causes the evaluation/processing function of the application software 12 (of FIG. 1) to process all of the voice input only to the data in the memory 16, which is restricted to the dictation word list or dictionary 28 shown in FIG. 2. After conventional processing, the results, as selected from the word list 28, are displayed at 29 on the CRT or display 18 of FIG. 1, for example.

The voice recognition software identified as the voice recognition application 12 of FIG. 1, however, also must be capable of processing commands for effecting various computer operations, as discussed previously. In order to do this, the key pad 22 of FIG. 1 includes a command button or key 134 (see FIG. 6) which, when depressed, switches the operation of the voice recognition application software 12 from its dictation mode to its voice command mode of operation. In FIG. 1, this is illustrated by outputs from the key pad 22 to both the CPU 10 and the voice recognition application software 12.

Figure 3:
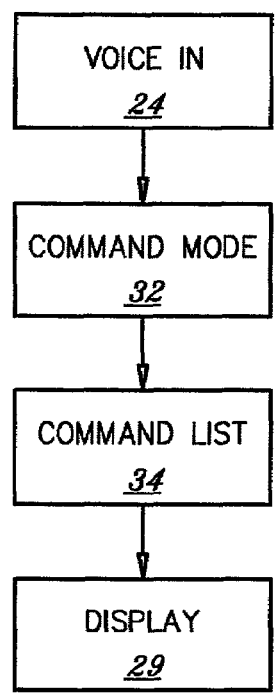
FIG. 3 is a flow chart of another mode of operation of the system shown in FIG. 1.

FIG. 3 illustrates the manner in which the voice recognition software of the voice recognition application 12 then processes speech when it is in the command-only mode. The voice input is at 24 as it is illustrated also in FIG. 2. The speech, however, is processed in the command mode at 33 because of the operation of the command button or key 134 (FIG. 6). As a consequence, the voice recognition software has its evaluation/processing function restricted to the command mode 32 only; so that no possible errors can result in an interpretation as to whether or not these are command signals or conventional dictated voice signals which are being processed. This restriction causes the evaluation/processing function to process the data only by comparing it with a limited command list 34 stored in the memory 16 and operated through the CPU 10. After the evaluation/processing task is completed, the results again are outputted for display at 29, and typically are displayed on the CRT 18 shown in FIG. 1.

Figure 4:
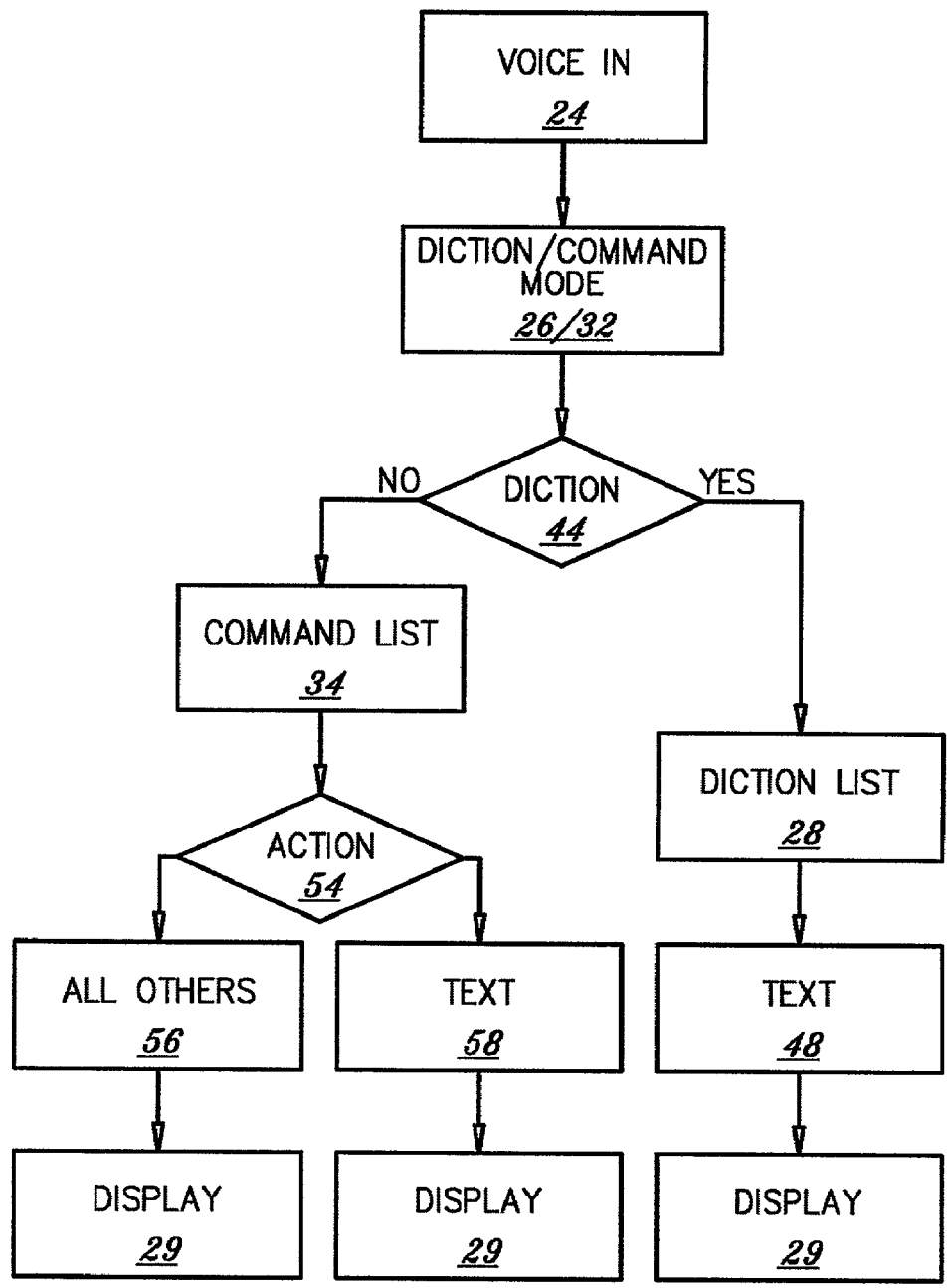
FIG. 4 is a more detailed flow chart combining the functions shown in FIGS. 2 and 3.

FIG. 4 is a composite flow chart illustrating how the voice recognition application software 12 processes speech into text when it is in either the dictation or command mode of operation, which are described separately in conjunction with FIGS. 2 and 3. Once again, the voice input is the same at 24 as it is illustrated in FIGS. 2 and 3. The voice, however, is applied through the dictation/command mode of operation at 26/32. In the default mode of operation, with no keys on the key pad 22 operated, the system defaults into the dictation mode at 44; and the decision is made that so long as it is in the dictation mode, all of the voice input is processed as described in conjunction with FIG. 2, through the dictation list 28. Typically, the dictation, after comparison with the dictation list 28, is formulated into text 48 for compilation and display at 29.

If the voice input at 24, however, is determined to be command by virtue of operation of the command key or button 134 (FIG. 6), the decision at 44 is that it is not dictation; and the command list 34 then is compared with the voice input to determine the nature of the command the action to be taken. The action taken is at 54; and if it is to be text, this is processed at 58 and displayed at 29, as described previously in conjunction with FIG. 3. On the other hand, if the command is not a text command, for example "next line", or "paragraph", it is determined to be another type of command and all other commands are processed at 56, and again, displayed at 50.

Figure 5:
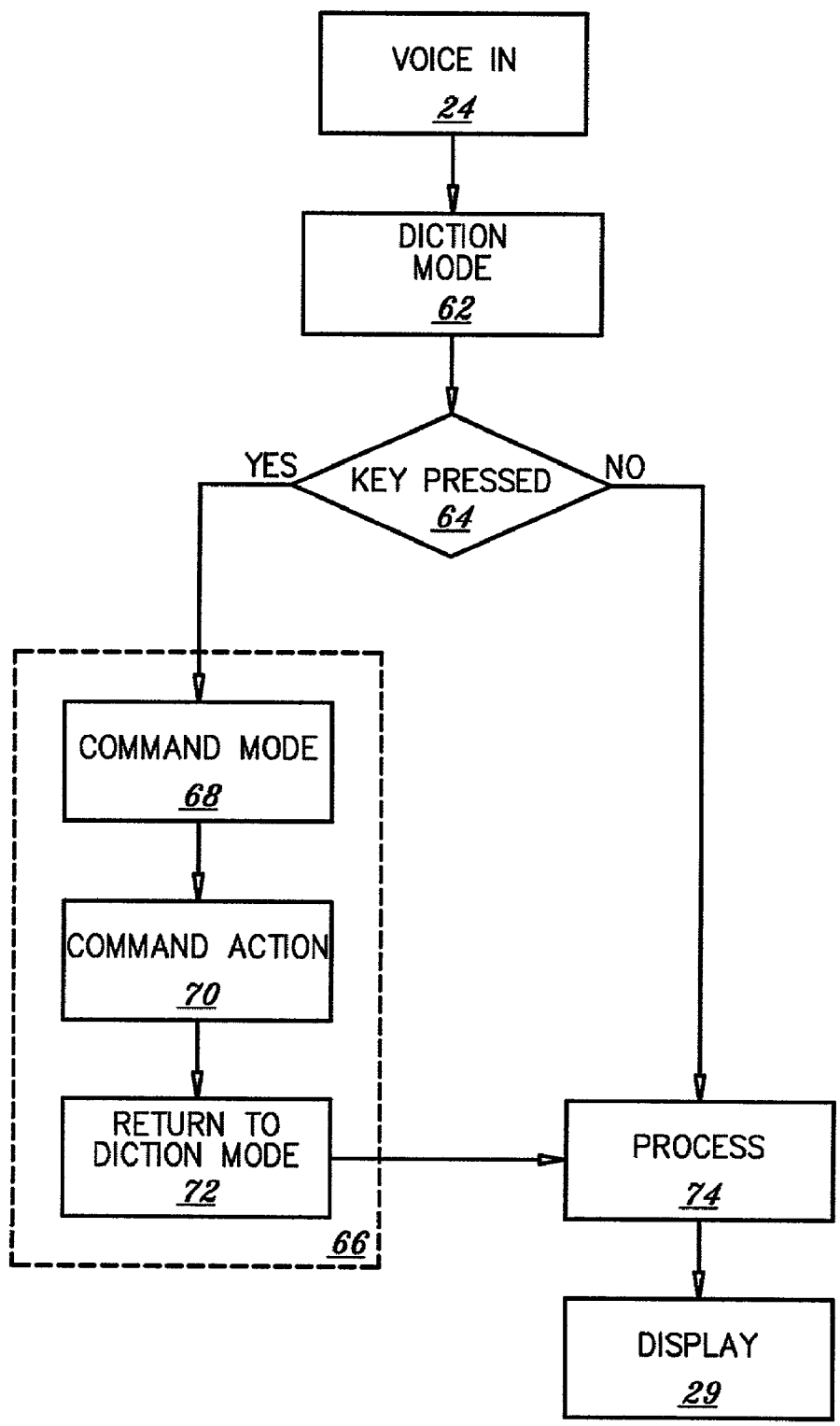
FIG. 5 is a flow chart illustrating a feature of the preferred embodiment of the invention.

FIG. 5 is a flow chart which is to be considered in conjunction with FIGS. 1 and 6. FIG. 5 is a simplified diagram of how the preferred embodiment of the invention, shown in FIG. 1, and a portion of which is illustrated in detail in FIG. 6, operates in controlling the operation of voice recognition software such as the voice recognition application 12 shown in FIG. 1. Once again, voice is inputted at 24 in the same manner described previously, by way of a microphone such as the microphone 14 shown in FIG. 1. As described previously, the system which is operated in conjunction with whatever specific voice recognition application software 12 is utilized, is defaulted always to operate in the continuous dictation mode of operation. This is shown in FIG. 5 by the block 62 illustrating the voice input as being processed in the dictation mode. If none of the keys on the keypad 22 are depressed, a decision is made at 64 that no keys are depressed; and the dictation mode of operation is processed at 74 in conjunction with the overall functions illustrated in FIG. 2 and displayed at 29. Consequently, continuous dictation may take place; and all of the voice input is defaulted as dictation input to be converted into text, and not as any operating instructions to the computer.

As illustrated within the dotted line box 66, if any of the keys 110 through 118 and 134 through 204 on the key pad 22 are depressed during voice input at 24, or during pauses in the voice input at 24, the system is switched from a dictation mode to a command mode of operation for the voice recognition application software 12. This means that the system then is operating generally in conjunction with the mode shown in FIG. 3. As stated previously in conjunction with FIG. 3, if the command key or button 134 is depressed, any subsequent voice input will be considered as command instructions and will be processed in a standard manner by the voice recognition application software 12 to perform whatever spoken command functions are matched with the command function list, such as the list 34 of FIG. 3. On the other hand, an automatic switch directly to the command operation (without voice commands) also is effected by any of the keys 110 through 118, or 136 through 234 to directly interject command actions to the computer, either overriding the voice input at the time the particular key is depressed, or operating to perform the command function by way of the CPU 10 during pauses in the voice input at 24.

For example, at any time any one of the keys 146 through 184 is depressed without a concurrent or previous operation of the shift key 186, the punctuation or numeral appearing at the bottom of the appropriate corresponding key 146 through 184 is interjected into and overrides the dictated text otherwise being processed by the system at 74. When the system is in the command mode with a key pressed at 64, the command action is supplied to the computer at 70; and that action is effected. If, for example, the key 146 is depressed, a period (.) is inserted into the text being produced by the dictation mode of the system at the point in time when the key 146 is depressed.

If the shift key 186 is operated, depression of any one of the keys 146 through 184 then produces the symbol shown on the upper portion of those same keys to insert that symbol into the text being processed at 74, automatically, without requiring a voice input to effect the command operation. Once a key 136 through 184, or any one of the other keys 110 through 186 and 134 through 204 is released, the system is returned immediately to its dictation mode at 72; and further dictation then is processed from 64 through the dictation process at 74 and displayed at 29.

The operation is essentially seamless, since the key pad 22 may be easily operated by one hand of an operator, and coordinated with the dictation currently transpiring to insert the proper punctuation, spaces, line feeds, deletions, backspaces, whatever, as dictation unfolds by the voice input at 24. In this manner, essentially seamless dictation may take place rapidly, considerably improving the speed at which voice activated dictation may be processed by the computer. Even more importantly, considerable improvement in the accuracy of the finished product is achieved, since the command signals are not confused with voice input signals. This result is obtained since in the absence of any operation of the command keys or buttons shown in FIG. 6, all of the voice or speech input is processed as dictation or input which is to be processed into text. It should be readily apparent that without requiring the inputting of spoken voice commands interjected into the dictated text, the flow of the finished product is considerably enhanced; and its accuracy is significantly improved.

From the foregoing, and from an understanding of the somewhat cumbersome requirements of the systems of the prior art for effecting commands, it is readily apparent that some operations and tasks are best performed manually. For example, redundant commands (punctuation, edit, spell, type, delete, pause, next line, next paragraph, capital/capital lock, and space) are much more efficiently processed by the use of the key pad 22 and the various keys shown in FIG. 6 than by requiring efforts to switch the operation of the voice recognition application software 12 from a dictation mode to a command mode and then speaking the various commands to effect these simple, repetitive operations. In addition, numbers which are dictation (ten) or commands (10) require specialized input in the conventional voice recognition systems to obtain the desired output results. Without some type of additional effort, the spoken word "ten" needs further interpretation to determine whether or not it is to be spelled out or written as a numeral. With the present system, numerals are entered directly from the key pad; and any time the word "ten" for example, is spoken, it will be processed as dictation and spelled out in full.

It should be noted that all actions which are required to perform needed operations accurately, whether they are to be executed by voice, mouse or keyboard, are present in the above identified, commercially available software. These operations, however, are extremely cumbersome to utilize in the normal operation of voice recognition software, which has caused such systems to be difficult to use and difficult to learn in order to period interaction with the software.

For a better understanding of the significance of the addition of the key pad 22 operating in conjunction with the processor which is shown in FIG. 5, an example of a typical dictated sentence is provided, with an explanation of the difference from the normal or conventional operation of voice recognition software and a voice recognition system modified in accordance with the system shown in FIG. 1 and explained in the processes of FIGS. 2 through 5. For example, consider the following: "How are you, your wife and kids?". In a normal dictation mode only translation of this question, the output would be: "how are you your wife and kids", without punctuation. In a speech recognition format, the same phrase would be dictated with a pause, then the words "double quote" then "capital" pause "How are you" pause "comma" pause "your wife and kids" pause "question" pause "double quote". The inability of present voice recognition software to minimize the redundant commands forces the operator of the system into an unnatural thought/speech process. Prior to all of the portions which are presented in italics above, the pause or pause plus the word "computer" needs to be made in order to cause the system to produce the correct capitalization and punctuation for this simple question. With the system which is shown in FIGS. 1 and 6 and the operation of which is illustrated in FIGS. 4 and 5, a normal flow of the dictated input may be effected with, at best, only minor pauses or interruptions in order to implement the directly entered command inputs to form the punctuation and capitalization required.

For example, the opening quotation is entered directly, prior to the question, by operating the shift key 186 and the key 154 followed by another operation of the shift key 186 (to capitalize the first letter of the following word). The dictation of the portion "How are you" takes place; and immediately after the word "you", operation of the key 148 is effected, with little or no pause in the ongoing dictation to insert the comma (,) after the word "you". Dictation then continues with "your wife and kids" followed immediately by depression of the shift key 186 and the key 150, and again the shift key 186 and the key 154. Since the operation of the keys take place through the functions of one hand of the person using the system, a seamless insertion of the appropriate punctuation and capitalization is effected as the dictation flows quickly and naturally. This improvement is effected by means of all of the various keys 110 through 118, 134 through 138, and 146 through 204.

Various other examples of other even more complex (as implemented by standard voice recognition applications) sequences can be illustrated to show the nearly seamless and effortless implementation of a continuous dictation flow with inserted command functions clearly and unequivocally entered by means of the key pad 22. A variety of functions are illustrated on the key pad shown in FIG. 6; and the arrangement of the specific keys, as well as the various designations of the keys which have been shown in FIG. 6, may be modified to fit particular applications.

It should be noted that the dictation of the foregoing material comprising the detailed portion of this specification, effected by means of a normal voice recognition software, is relatively tedious because of the frequent insertion of numerals (reference numbers) in the middle of dictated text. With the system which is shown in FIGS. 1 and 6 and which is described in conjunction with the flow charts of FIGS. 2 through 5, the implementation of relatively rapid and error free dictation of material such as the foregoing specification is considerably enhanced.

In FIG. 6, the keys 110 through 118 are designated with common operating instructions, respectively, as "edit, spell, type, delete and pause". These command keys, whenever they are depressed, cause the software to open the appropriate windows, or to effect the appropriate instructions in accordance with conventional commands. For example, the edit key 110 is a command function key that, when depressed, sends a function call to the software to open the edit or correction window. The spell key 112 is a command function key which, when depressed, sends a function call to the software to process the following input as phonetic, save the input for training the software, until return is executed. The type key 114 is a command function key which, when depressed, sends a function call to the software to process the following input by way of the keyboard or phonetically, until return is executed. The delete key 116 is a command function key which, when depressed, sends a function call to the software to delete the selected text and return to dictation. The delete key 116 functions in the same manner as the delete key on the keyboard 20 or in a window panel. The pause key 118 is a command function key which, when depressed, sends a function call to the software to pause the voice recognition software. To restart the software, the key 118 is pressed again.

In addition to the computer command keys which have been outlined generally above, the key pad 22 also may include the standard left-mouse button 120, right-mouse button 122, a track ball 124 and cursor control keys 126, 128, 130 and 132, along with a back space key 140 and an enter key 142. These controls operate in the standard manner of the similar controls on a standard keyboard; but their inclusion on the key pad 22 is provided for convenience of the user, since these functions are frequently used in conjunction with other commands used during dictation of information by way of a voice recognition software, or in conjunction with any other type of inputs to the CPU 10.

The illustrations on the keys 146 through 184 are self-explanatory. When the system is operated in its lowercase mode, the symbols provided at the bottoms of each of these respective keys are automatically inserted into the dictated voice input text at the time and point of operation of the respective keys. The cap/cap lock key 190 is a command function key which, when depressed, sends a function call to the software to capitalize the first letter of the current data string, or when depressed with the shift key 186, instructs the software to capitalize the following data until further instructions are inputted. To return to a no capital letters production of the text which is processed at 74 and displayed at 29, the cap/cap lock key 190 is depressed a second time. The space bar key 192 is a command function key which, when depressed, sends a function call to the software to insert a space at the current position of the cursor in the text displayed at 29 (FIG. 5).

The five keys 196 through 204 designated as "hot keys" at the bottom of the key pad 22 in FIG. 6, are programmable split keys which allow the user to define up to ten different functions. These may be macros or combination command functions which are uniquely required by the particular user of the system.

The foregoing description of the preferred embodiment of the invention is to be considered as illustrative and not as limiting. An important difference between the utilization of a voice recognition application in conjunction with the key pad shown in detail in FIG. 6, and shown generally in FIG. 1, over a standard voice recognition input and data processing system and method is that the system and method described above uses a specialized key pad for localizing redundant commands and mouse functions to allow the user operation of the voice recognition software with a minimum of hand/finger movement. In addition, the system controls the input voice recognition processing method by denoting data as a command or dictation. Further, by operating continuously in a "dictation only" mode, the error possibilities in the finished product as displayed at the display 29 (18 in FIG. 1) is significantly reduced.

Various changes and modifications will occur to those skilled in the art for accomplishing substantially the same function, in substantially the same way, to achieve substantially the same result, without departing from the true scope of the invention as defined in the appended claims.

What is claimed is:

1. A speech recognition system having a dictation mode of operation for converting spoken words into text and having a command capability for causing a computer to perform specific actions in response to command inputs, said system including in combination:
    a speech recognition application operating in a dictation mode and responsive to voice input for providing corresponding text output to a computer; and
    a key pad coupled with the computer and having a plurality of different dedicated function keys on the key pad, each inserting different specific commands during the dictation mode of the speech recognition application upon operation of each different function key to insert the different specific commands corresponding to the operated function key into the text output to the computer.

2. The speech recognition system according to claim 1 wherein the computer has at least one USB port, and the key pad is coupled through the USB port to the computer.

3. The speech recognition system according to claim 2 wherein the key pad further is coupled with the speech recognition application and includes a voice command key thereon for causing voice input to the speech recognition application to insert voice enabled command outputs to the computer instead of dictation outputs following operation of the voice command key.

4. The speech recognition system according to claim 3 wherein the key pad further includes cursor positioning means.

5. The speech recognition system according to claim 1 wherein the key pad further is coupled with the speech recognition application and includes a voice command key thereon for causing voice input to the speech recognition application to insert voice enabled command outputs to the computer instead of dictation outputs following operation of the voice command key.

6. The speech recognition system according to claim 5 wherein the computer has at least one USB port, and the key pad is coupled through the USB port to the computer.

7. The speech recognition system according to claim 1 wherein the key pad further includes cursor positioning means.

8. The speech recognition system according to claim 1 wherein the computer has at least one USB port, and the key pad is coupled through the USB port to the computer.

9. A method for converting spoken words into text through the operation of a computer and also causing the computer to perform specific actions in response to command inputs, the method including the steps of:
    employing a speech recognition application responsive to voice input and operating in a dictation mode to provide corresponding text output to a computer;
    providing a key pad with a plurality of dedicated function command keys thereon for operation during the dictation mode operation of the speech recognition application to insert specific command inputs into the text output produced by the speech recognition application in response to operation of keys on the key pad, wherein each key is dedicated to different command inputs.

10. The method according to claim 9 wherein at least some of the plurality of dedicated function command keys on the key pad provide corresponding punctuation or numeral command inputs to the computer upon operation thereof.

11. The method according to claim 10 wherein the speech recognition application normally is operated in the dictation mode responsive to voice input at all times.

12. The method according to claim 11 further including the step of providing a voice command key on the key pad for operation to cause subsequent voice inputs to the speech recognition application to be recognized thereby as command insertion instructions to the computer.

13. The method according to claim 12 further including the step of providing at least one programmable hot key on the key pad for inserting user programmable commands to the computer corresponding to the operation of the hot key.

14. The method according to claim 9 further including the step of providing a voice command key on the key pad for operation to cause subsequent voice inputs to the speech recognition application to be recognized thereby as command insertion instructions to the computer.

15. The method according to claim 14 wherein the speech recognition application normally is operated in the dictation mode responsive to voice input at all times.

16. The method according to claim 9 further including the step of providing at least one programmable hot key on the key pad for inserting user programmable commands to the computer corresponding to the operation of the hot key.

17. The method according to claim 9 wherein the speech recognition application normally is operated in the dictation mode responsive to voice input at all times.

* * * * *